No. 879,411. PATENTED FEB. 18, 1908.
H. S. PRENTISS.
SELF WINDING CLOCK.
APPLICATION FILED SEPT. 14, 1906.

3 SHEETS—SHEET 1.

Witnesses
Henry S. Prentiss Inventor
By His Attorney

No. 879,411.  
PATENTED FEB. 18, 1908.  
H. S. PRENTISS.  
SELF WINDING CLOCK.  
APPLICATION FILED SEPT. 14, 1906.

3 SHEETS—SHEET 3.

UNITED STATES PATENT OFFICE.

HENRY S. PRENTISS, OF ELIZABETH, NEW JERSEY.

SELF-WINDING CLOCK.

No. 879,411.   Specification of Letters Patent.   Patented Feb. 18, 1908.

Application filed September 14, 1906. Serial No. 334,661.

*To all whom it may concern:*

Be it known that I, HENRY S. PRENTISS, a citizen of the United States, and a resident of Elizabeth, in the county of Union and State of New Jersey, have invented certain new and useful Improvements in Self-Winding Clocks, of which the following is a specification.

My invention relates to self-winding clocks and particularly to that class of self-winding clocks in which the winding mechanism is electrically controlled, the circuit being automatically closed at stated periods.

It has for its object to provide and insure a more perfect and more certain circuit closing mechanism.

For this purpose my invention consists essentially in the combination with a weight actuated clock mechanism of means to close an electric circuit when the weight has descended a predetermined distance and to thereby automatically return the weight to its active position.

The nature of my invention will best be understood in connection with the accompanying drawings in which—

Figure 1:
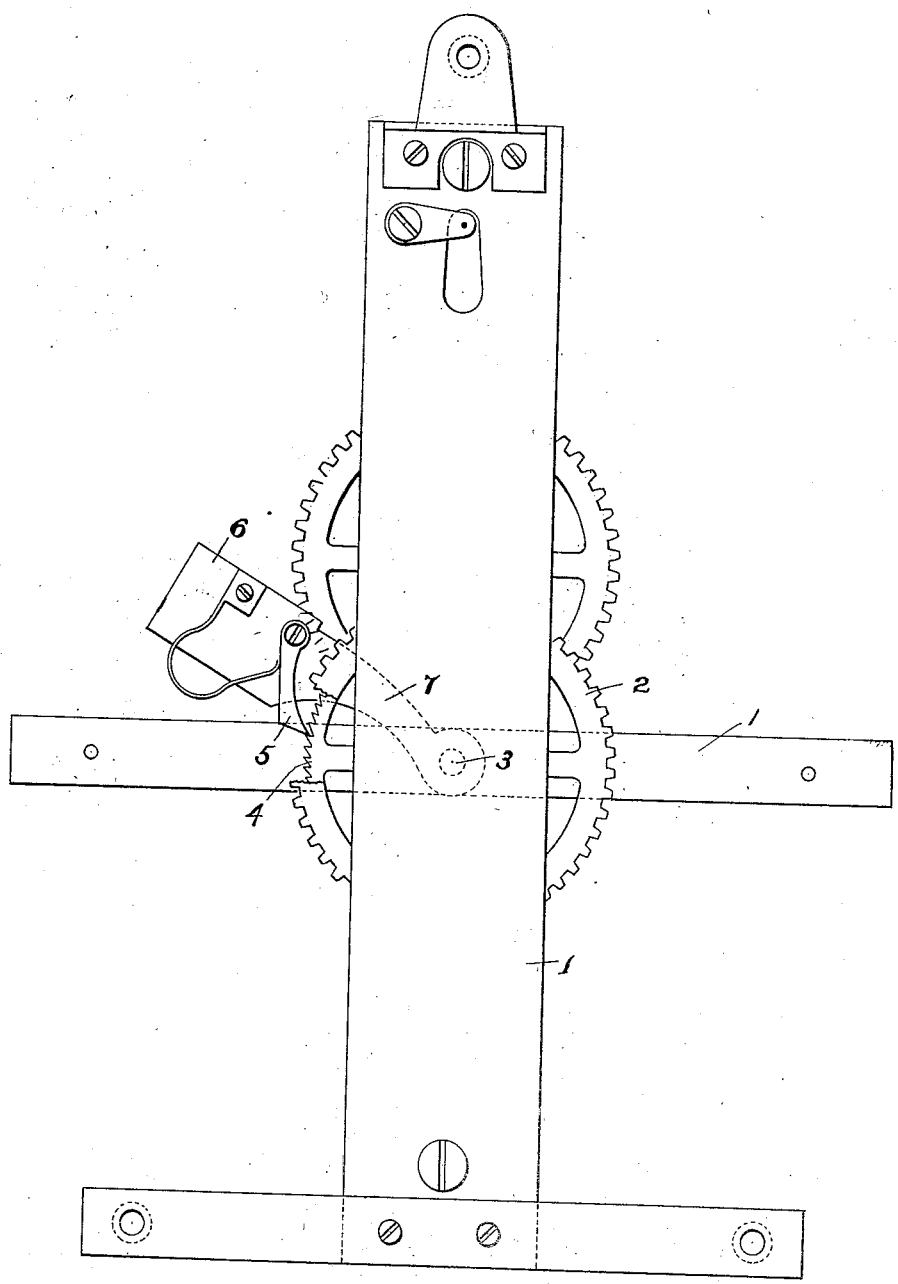
Figure 2:
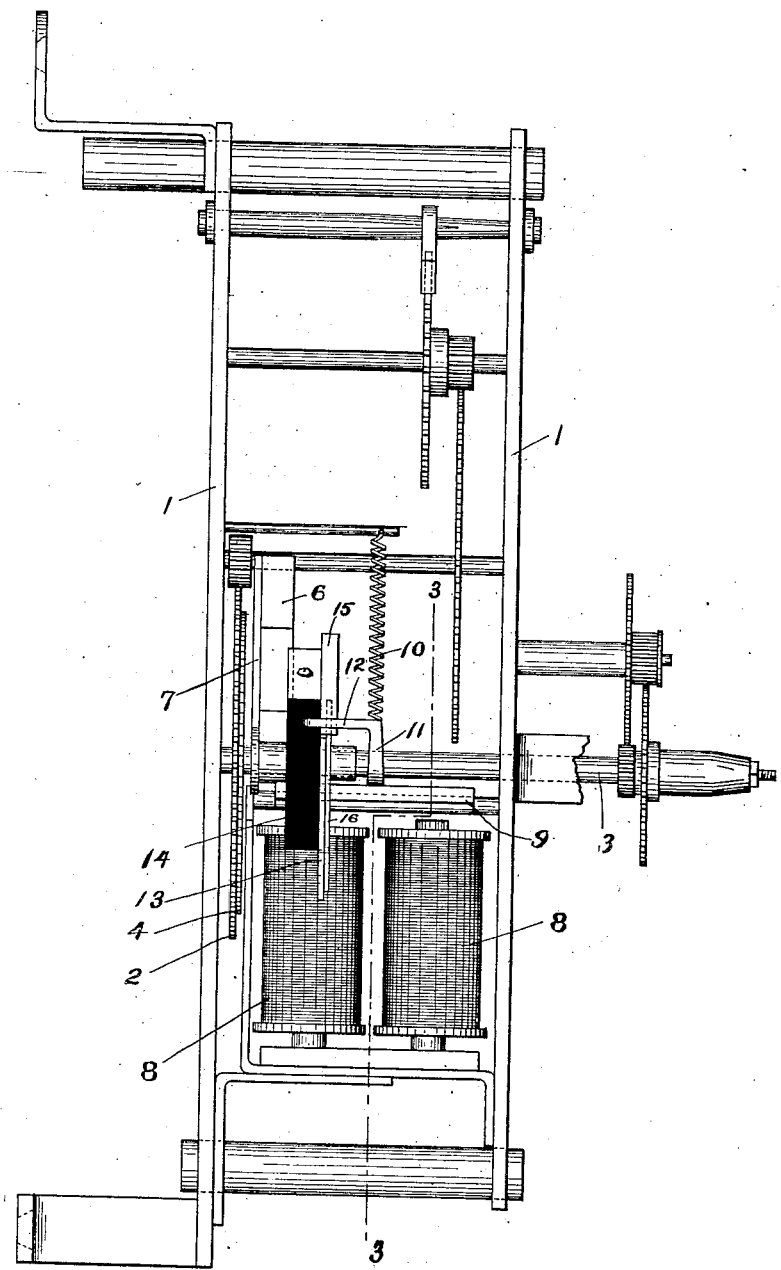
Figure 3:
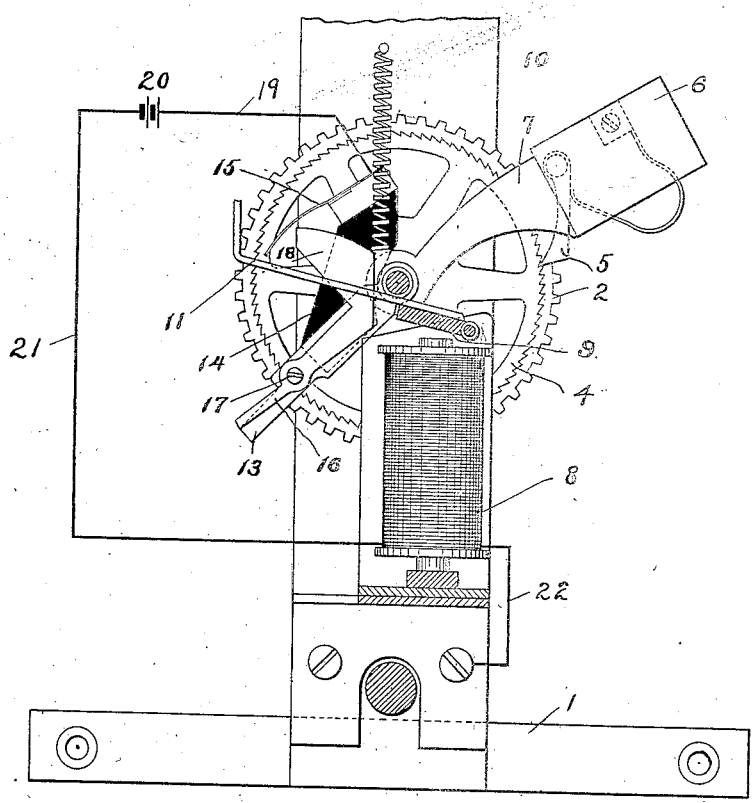
Figure 4:
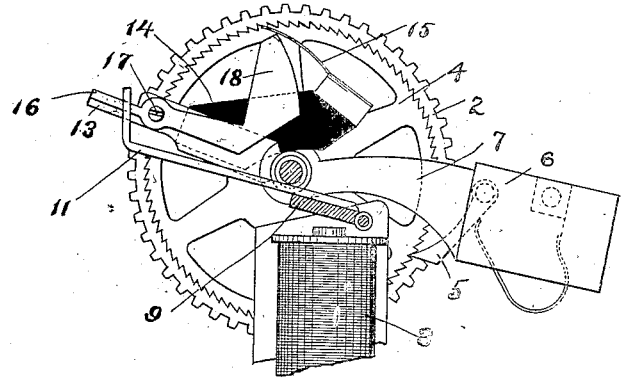

Figure 1 is a rear elevation of the self-winding clock. Fig. 2 is a side elevation. Fig. 3 is a partial section on the line 3—3 Fig. 2, showing the weight in elevated or active position. Fig. 4 is a similar section but shows the weight in lowered position and the contact mechanism about to close the electric circuit.

Similar numerals of reference designate corresponding parts throughout the several views.

Referring now to the drawings, 1 indicates the frame of a clock mechanism comprising the usual train of wheels, the center wheel 2 being mounted upon the arbor 3. Adjacent to the center wheel 2 and likewise mounted upon the shaft or arbor 3 is a ratchet wheel 4 engaged by a spring pressed pawl 5 mounted upon the actuating weight 6. The weight 6 is carried by an arm 7, and is of suitable mass to drive the clock mechanism. The arm 7 carrying the weight 6 is mounted to rotate about the shaft 3 and the action of the weight through the pawl 5 is to rotate the ratchet wheel 4 and thereby the center wheel 2 and its shaft 3, thereby operating the entire clock mechanism. In Fig. 3 the weight 6 is shown in its elevated and active position while in Fig. 4 it is shown at the completion of its downward movement and about to be returned to the elevated position shown in Fig. 3 through the following means.

When the weight 6 has run down to the position shown in Fig. 4, it closes an electric circuit thereby energizing an electro-magnet 8 which attracts an armature 9 pivoted directly above said electro-magnet and normally held away from it by a spring 10. To the armature 9 is rigidly secured an arm 11 provided with the cross-piece 12. In rigid connection with the arm 7 but on the opposite side of the shaft 3 about which it is also adapted to rotate is a second arm 13. The weight and its arm therefore move in conjunction with the arm 13 and as the former moves downward the latter is correspondingly elevated until its end comes in contact with the cross-piece 12, and is in the position shown in Fig. 4. To the arm 13 is also attached a block of insulating material 14, which shares its motion and which carries at its top a contact brush 15. A lever 16 is pivoted at 17 to the arm 13 and likewise shares its motion. The inner arm 18 of this lever 16 normally bears against the collar upon the shaft 3 and has its upper edge normally out of contact with the brush 15. The outer edge of said lever 16 is normally in the position shown in Fig. 3 but when the weight 6 has descended to the position shown in Fig. 4 and has thereby raised the arm 13, the outer arm of the lever 16 is forced downwardly as shown in Fig. 4 by coming into contact with the cross-piece 12 as the arm 13 rises. As the outer arm of the lever 16 is thus forced downwardly by the cross-piece 12, its inner arm 18 is moved upwardly and comes into contact with the brush 15 making a rubbing contact. The brush 15 is connected with one pole of the battery 20 by the wire 19, and the other pole being connected by the wire 21 to the electro-magnet 8 which is also connected to the frame 1 by the wire 22—the circuit then being through the mechanism back to the lever 16 through the contact brush 15. The circuit is thus closed as this arm 18 rubs against the brush 15, and the electro-magnet 8 thereby energized. This causes the armature 9 to be attracted downwardly by the magnet, carrying with it the arm 11 whose cross-piece 12 is in contact with the arm 13 and the lever 16, and likewise forces these downwardly, and in so doing raises the weight 6 back into active position. The momentum caused by the sudden downward movement of the armature, causes the arm 13 to be carried considerably beyond a horizontal position assuming a position approximately as shown in Fig. 3, and thereby leaving the cross-piece 12 and releasing the arm 16. The arm 18 therefore falls back, and the circuit is broken and the armature 9 released. The weight 6 then again descends actuating the clock mechanism until it reaches the position shown in Fig. 4, when the same operation is repeated.

Of course I may provide the usual maintaining devices to correct for any time lost during the elevation of the weight, but this is not usually necessary and forms no essential part of my invention.

What I claim as new and desire to secure by Letters Patent of the United States is:—

1. The combination with a weight actuated clock mechanism, and an electric circuit; of an electro-magnet in said electric circuit provided with an armature carrying an arm having a cross-piece at its extremity, a second arm adapted to oscillate with said weight, and means carried by said arm to close said electric circuit in conjunction with said cross-piece when the weight has descended a predetermined distance.

2. The combination with a weight actuated clock mechanism, and an electric circuit; of an electro-magnet in said electric circuit provided with an armature carrying an arm having a cross-piece at its extremity, a second arm adapted to oscillate with said weight, means carried by said arm to close said electric circuit in conjunction with said cross-piece when the weight has descended a predetermined distance, and means to break said electric circuit.

3. The combination with a clock mechanism, the center wheel arbor, a ratchet wheel mounted thereon, a weight carrying a spring pressed pawl engaging said ratchet wheel and adapted to rotate said arbor, and an electric circuit; of an electro-magnet in said electric circuit provided with an armature carrying an arm having a cross-piece at its extremity, a second arm adapted to oscillate with said weight, and means carried by said second arm to close said electric circuit in conjunction with said cross-piece when the weight has descended a predetermined distance.

4. The combination with a weight actuated clock mechanism and an electric circuit; of an electro-magnet in said electric circuit provided with an armature carrying an arm having a cross-piece at its extremity, a second arm adapted to oscillate with said weight, a contact brush carried by said second arm, a lever pivoted upon said second arm and having its outer arm arranged to engage with said cross-piece when said weight has descended a predetermined distance and thereby bring its inner arm into rubbing contact with the said contact brush to close said electric circuit, whereby the armature is attracted by the electro-magnet depressing the said arm and its cross-piece as well as the second arm and thereby restoring the weight to its active position and breaking said electric circuit.

5. The combination with a clock mechanism, the center wheel arbor, a ratchet wheel thereon, a weight carrying a spring pressed pawl engaging said ratchet wheel and adapted to rotate said arbor, an electric circuit, and an electro-magnet in said electric circuit; of a circuit closing device comprising an armature arranged to be controlled by said electro-magnet and carrying an arm having a cross-piece at its extremity, a second arm adapted to oscillate with said weight, a contact brush carried by said second arm, a lever pivoted upon said second arm its outer arm being adapted to engage with said cross-piece when said weight has descended a predetermined amount, and thereby bring its inner arm into rubbing contact with the said contact brush to close said electric circuit, whereby the armature is attracted by the electro-magnet depressing said arm and its cross-piece as well as the second arm and restoring the weight to its active position and breaking said electric circuit.

Signed at New York, in the county of New York and State of New York, this 12th day of Sept., A. D. 1906.

HENRY S. PRENTISS.

Witnesses:
O. R. MITCHELL,
F. B. MACKINNEY.